(12) United States Patent
Otto et al.

(10) Patent No.: US 12,210,508 B1
(45) Date of Patent: Jan. 28, 2025

(54) DATABASE TABLE COMPARISON

(71) Applicant: SAP SE, Walldorf (DE)

(72) Inventors: Maximilian Otto, Karlsruhe (DE); Ralph Wagenfuehrer, Lambsheim (DE); Philipp Kugler, Fußgönheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/533,025

(22) Filed: Dec. 7, 2023

(51) Int. Cl.
*G06F 16/30* (2019.01)
*G06F 16/23* (2019.01)

(52) U.S. Cl.
CPC ............................. *G06F 16/2365* (2019.01)

(58) Field of Classification Search
CPC .................................................. G06F 16/2365
See application file for complete search history.

(56) References Cited

U.S. PATENT DOCUMENTS

| | | | |
|---|---|---|---|
| 8,060,397 B2 | 11/2011 | Neumaier et al. | |
| 10,248,736 B1 * | 4/2019 | Carroll | G06F 16/211 |
| 2007/0088733 A1 * | 4/2007 | Bodge | G06F 16/22 |
| | | | 707/999.102 |
| 2011/0264625 A1 * | 10/2011 | Samudrala | G06F 16/25 |
| | | | 707/723 |
| 2019/0155801 A1 * | 5/2019 | Karunanithi | G06F 16/248 |
| 2019/0205294 A1 * | 7/2019 | Cazin | G06F 16/273 |
| 2021/0200744 A1 * | 7/2021 | Gubba | G06F 16/214 |
| 2024/0169367 A1 * | 5/2024 | Stipelman | G06Q 30/018 |

* cited by examiner

*Primary Examiner* — Khanh B Pham
(74) *Attorney, Agent, or Firm* — Klarquist Sparkman, LLP

(57) ABSTRACT

Rows of first and second tables that share common values for one or more designated key fields can be considered partner rows to facilitate computer-based comparison of the tables. Responsive to a user request to compare the first and second tables, which designates field(s) common to both data tables as key fields and field(s) common to both data tables as comparison fields, a matches table is generated which includes the key field(s), comparison field(s), and a source field whose value indicates the originating table of the data in the row. For each set of partner rows, the matches table is populated with data from the partner rows. The data in the matches table is handled, and a results table is populated with the results of the handling of the data in the matches table and with data from any unpartnered rows in the first and second tables.

20 Claims, 11 Drawing Sheets

DATABASE TABLE COMPARISON

FIELD

The field generally relates to comparison of data tables in a database context.

BACKGROUND

Despite advances in database technology, it can still be difficult to meaningfully convey differences between two versions of a data table to a user.

For example, if a user wishes to view the differences between two tables, an existing approach includes comparing the first row of the first table with the first row of the second table, comparing the second row of the first table with the second row of the second table, and so on for all the rows in the tables. Although such a process will identify differences between the two tables from a database perspective, these are not the differences the user is typically seeking. For example, if the second table is missing one row at the beginning but is otherwise identical to the first table, the result of this approach would be an indication that all rows of the two tables are different. Accordingly, the result ends up being unnecessarily long and it is difficult for the user to understand any substantial differences between data in the two tables.

DETAILED DESCRIPTION

Example 1—Overview

Performing a computer-based comparison of two data tables, e.g., in a database system, can be facilitated by performing intermediate steps which segregate and compare "partner rows." Partner rows can refer to rows of data which include common values for one or more fields designated as "key fields." In practice, a user can select key field(s) that are common to two tables that will be compared. The values of the key field(s) will not be compared; rather, partner rows among the two data tables with respective common values for the key field(s) will be inserted in a matches table, which is then sorted by one or more "comparison fields." The values of the comparison field(s) of the partner rows are subsequently compared by a specific procedure that provides improved legibility relative to existing approaches for comparing data tables.

For example, upon receipt of a request to compare first and second tables, the first and second tables can each be sorted by their key field(s) and comparison field(s). The key field(s) and comparison field(s) can be specified in the request. Other fields of the first and second tables which are neither key fields nor comparison fields can also be specified in the request. The key field(s) can be used to designate sets of partner rows among the two tables. In particular, rows of the first and second tables whose respective key field(s) have matching values can be designated as partner rows.

Each set of partner rows can be inserted in a matches table and handled using a duplicate-aware row matching technique. In the duplicate-aware row matching technique, partner rows from different source tables are selected based on their proximity in the matches table and compared separately, with excess data (e.g., deleted or unchanged rows) omitted from a results table. The comparison can be based on one or more designated comparison fields; other fields of the tables which are neither comparison fields nor key fields can be omitted from the comparison process to reduce the processing load.

The value(s) of the key field(s) for each set of partner rows and each unpartnered row are written to a table referred to as a "key safe." The key safe can be referred to during handling of the data in the matches table to determine whether a given row has already been handled.

The described technologies thus offer considerable improvements over conventional techniques for comparing data tables.

Example 2—Example Database Table Comparison

Figure 1:
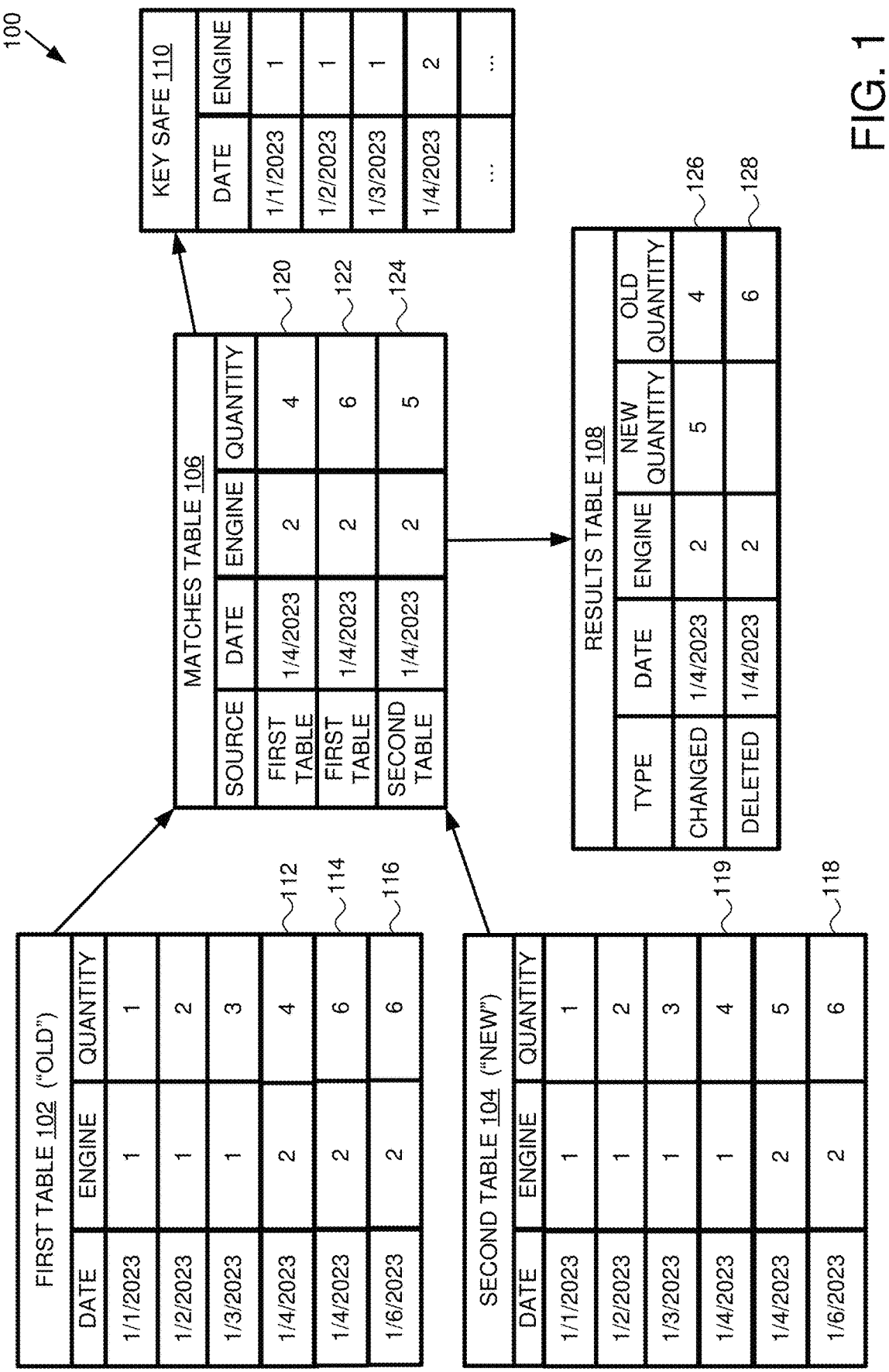
FIG. 1 is a block diagram of an example database system in which a data table comparison can be implemented.

FIG. 1 is a block diagram of an example database system 100 in which a data table comparison can be implemented. Database system 100 can include a first data table ("Table 1") 102 and a second data table ("Table 2") 104 containing rows of data for comparison, a matches table 106, a results table 108, and a key safe 110. First data table 102 and second data table 104 are alternatively referred to simply as first table 102 and second table 104 for the sake of brevity. First table 102 and second table 104 can also be referred to as first and second data structures. The depicted tables can be part of a single database within database system 100, or alternatively, database system 100 can include multiple databases that each include one or more of the tables. Database system100 can also include additional components which are not shown in FIG. 1. In examples where database system includes multiple databases, the databases can be connected via wired connections or via wireless connections (e.g., over a network or via a Cloud).

First table 102 and second table 104 can each include at least one row. Each row can include respective values for each of a plurality of fields. The plurality of fields can include at least one field designated as a "key" field and at least one field designated as a "comparison" field. Optionally, the plurality of fields can include at least one field designated as an "other" field. For example, as shown, first table 102 includes rows 112, 114, and 116, each of which includes values for a date field, an engine field, and a quantity field. The date field and the engine field are designated as key fields in the example, whereas the quantity field is designated as a comparison field. The values of the key fields serve to define which rows will be compared, but do not influence the comparison itself. In examples where multiple fields are designated as key fields, a set of values of the designated key fields can be referred to as a key combination. However, references to a key combination herein can also be interpreted as referring to a single key value.

Rows having matching values for all designated key fields are referred to herein as partner rows. The values of the key fields of rows 112 and 114 match: both rows have a date field with a value of "1/4/2023" and an engine field with a value of "2". Accordingly, rows 112 and 114 can be considered "partner rows." In contrast, the date field of row 116 has a value of "1/6/2023" and the engine field of row 116 has a value of "2". Because the values of all designated key fields (i.e., the date and engine fields) do not match the values of all designated key fields of either row 112 or row 114, row 116 does not have any partner rows in first table 102. However, row 116 does have a partner row in second table 102: row 118 of second table 104 has values for the designated key fields that match those of row 116 (i.e., rows 116 and 118 both have a date field with a value of "1/6/2023" and an engine field with a value of "2").

During a data table comparison, partner rows associated with the designated key combination are inserted in matches table 106. Matches table 106 includes the designated key field(s) (i.e., date and engine fields in the example), the comparison field(s) (i.e., the quantity field in the example), and a source field. The source field of a given row in the matches table 106 indicates the table from which the row originated. For example, in the first two rows of matches table 106, the source field has the value "first table" as these rows originated from first table 102. In contrast, in the third row of matches table 106, the source field has the value "second table" as this row originated from second table 104.

In the example, matches table 106 is depicted prior to being sorted. In practice, the matches table 106 can be sorted by the quantity field after being populated with the data from the first table 102 and second table 104, prior to the comparison process described below. As a result, the second and third rows of matches table 106 would swap positions such that the values of the quantity field increase as the row number increases. Similarly, in examples in which the matches table includes multiple comparison fields, the matches table would be sorted by all of the comparison fields prior to the comparison process.

During the data table comparison, certain rows of matches table 106 are compared with one another after matches table 106 has been sorted. For the purposes of the comparison, the first table 102 is treated as the "old" version of the table, while the second table 104 is treated as the "new" version of the table. As described further herein, each row in matches table 106 from the first table 102 is compared with the closest row from the second table in matches table 106.

The results table 108 is then populated with values reflecting the results of the comparison. As shown, the results table 108 includes the designated key field(s), a type field, and "new" and "old" fields for each comparison field. The type field indicates how the data in the comparison field(s) changed between the selected row of matches table 106 that originated from the first table 102 and the closest row of matches table 106 that originated from the second table 104. Example values of the type field can include "changed," "deleted," and "added."

For example, row 126 of results table 108 reflects a comparison between row 120 of matches table 106 (which originated from the first table 102) and row 124 of matches table 106 (the closest row of matches tables 106 that originated from the second table 104). The "changed" value of the type field of row 126 indicates that the comparison field in row 124 has a different value than the comparison field in row 120. In particular, the comparison field (i.e., the quantity field in the example) in row 120 has a value of 4, whereas the comparison field (quantity field) of row 124 has a value of 5. Accordingly, the value of the new quantity field of row 126 is 5 (corresponding to the value of the quantity field in row 124), whereas the value of the old quantity field of row 126 is 4 (corresponding to the value of the quantity field in row 120).

In contrast, as there are no other rows in matches table 106 that originated from the second table 104, there are no rows to compare with row 122 of matches table 106. As a result, row 128 of results table 108 has a value of "deleted" for the type field. This indicates that the matches table 106 does not contain a row corresponding to the row being compared (i.e., row 122), and thus that a corresponding row does not exist in second table 104. Indeed, if the number of rows in matches table 106 with a value of "first table" in the source field exceeds the number of rows in matches table 106 with a value of "second table" in the source field by some number n, the results table will have n rows with values of "deleted" for the type field.

While not depicted in FIG. 1, the type field of results table 108 can have a value of "added" when there are no rows in matches table 106 that originated from the first table 102 to compare with a row of the matches table 106 that originated from the second table 104. Indeed, if the number of rows in matches table 106 with a value of "second table" in the source field exceeds the number of rows in matches table 106 with a value of "first table" in the source field by some number n, the results table will have n rows with values of "added" for the type field.

The key safe 110 can be a key safe table that includes the designated key fields; accordingly, in the example, key safe 110 includes a date field and an engine field. As described further herein, the key safe 110 is populated with key combinations during the comparison process. In the example, the key safe 110 has been populated with the following key combinations: (Jan. 1, 2023, 1); (Jan. 2, 2023, 1); (Jan. 3, 2023, 1); and (Jan. 4, 2023, 2). As the comparison continues, additional key combinations can be added to key safe 110 (e.g., the key combination (Jan. 6, 2023, 2).

Any of the systems herein, including the system 100, can comprise at least one hardware processor and at least one memory coupled to the at least one hardware processor.

The system 100 can also comprise one or more non-transitory computer-readable media having stored therein computer-executable instructions that, when executed by the computing system, cause the computing system to perform any of the methods described herein.

In practice, the systems shown herein, such as database system 100, can vary in complexity, with additional functionality, more complex components, and the like. For example, the depicted tables can include significantly more fields and/or rows. Further, the database system100 can include significantly more tables than what is depicted.

The described database system 100, and the components thereof, can be networked via wired or wireless network connections, including the Internet. Alternatively, the components within database system 100 can be connected through an intranet connection (e.g., in a corporate environment, government environment, or the like).

The database system 100 and any of the other systems described herein can be implemented in conjunction with any of the hardware components described herein, such as the computing systems described below (e.g., processing units, memory, and the like). In any of the examples herein, the first table 102, second table 104, matches table 106, results table 108, key safe 110, and the like can be stored in one or more computer-readable storage media or computer-readable storage devices. The technologies described herein can be generic to the specifics of operating systems or hardware and can be applied in any variety of environments to take advantage of the described features.

Example 3—Example Method Implementing a Data Table Comparison

Figure 2:
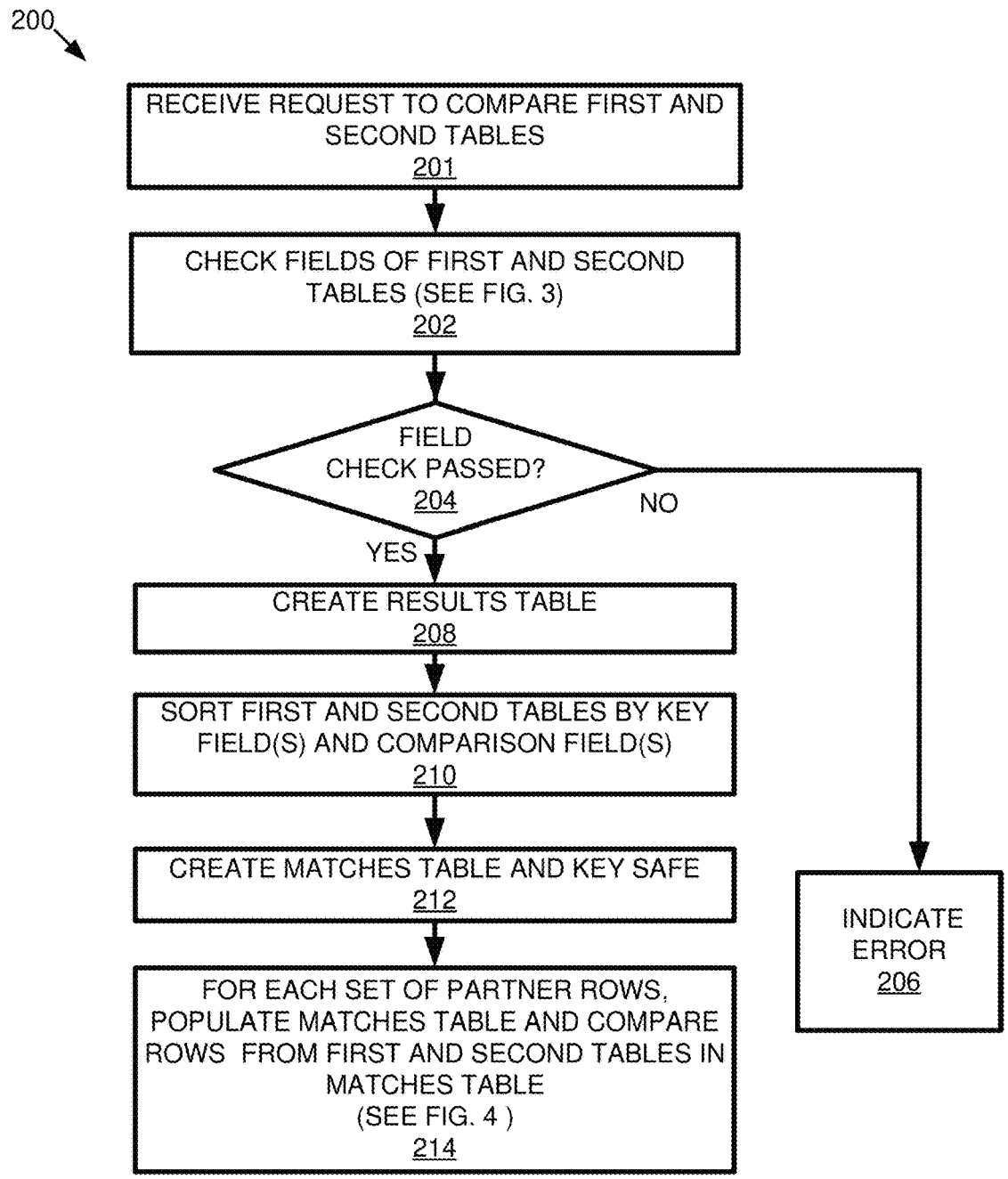
FIG. 2 is a flowchart of an example method of comparing two data tables containing one or more common key fields.

FIG. 2 is a flowchart of an example method 200 implementing a data table comparison and can be performed, for example, by the database system of FIG. 1. Method 200 can be used to compare a first table and a second table that include multiple common fields. One or more of the common fields can be designated as key fields, and one or more fields among the common fields which have not been designated as key fields can be designated as comparison fields. As detailed herein, rows with matching values for all the designated key fields can be inserted in a matches table and compared, and a results table can be populated with the results of the comparison.

In the example, at 201, a request to compare first and second tables is received. The request can be initiated by a user via a user interface of the database system, or by a processor or another component of the database system. The request can also include one or more of the following. an indication of which field(s) common to the first and second table are to be designated as the key field(s); an indication of which field(s) common to the first and second tables are to be compared (e.g., which fields to designate as the comparison fields); and an indication of which field(s) common to the first and second tables to designate as other fields (e.g., fields whose values will not be compared and will appear in the results table). Fields which are not included in the request (e.g., fields which are not key fields, comparison fields, or other fields) are ignored and will not appear in the results table.

At 202, the fields of the first and second tables are checked. Checking the fields can include determining whether the first and second tables both have the same key fields and comparison fields, among other checks, to determine whether the first and second tables can be compared via the techniques described herein. An example method for checking the fields is described below with reference to FIG. 3.

At 204, it is determined whether the field check passed. If the field check did not pass, an error is indicated at 206. For example, indicating an error can include the database system transmitting an error message for display in a user interface of a client computing device.

Otherwise, if the field check passed, the method proceeds to create a results table at 208. The results table (e.g., results table 108 of FIG. 1) can include a type field, one or more key fields, and "new" and "old" fields for each comparison field common to the first and second tables. The results table created at 208 is empty such that it can be populated during a subsequent comparison of the first and second tables.

At 210, the first and second tables are each sorted by the key field(s) and comparison field(s) they contain. The sorting can be performed to prepare the first and second tables to be compared with each other. In the example shown in FIG. 1, first table 102 and second table 104 have already been sorted by their key fields (date and engine) and comparison field (quantity). Accordingly, in both first table 102 and second table 104, the values of the date field, engine field, and quantity field increase as the row number increases.

At 212, a matches table and a key safe are created. The matches table (e.g., matches table 106 of FIG. 1) can include a source field, the key field(s) common to the first and second tables (e.g., date and engine fields in FIG. 1), the comparison field(s) common to the first and second tables (e.g., the quantity field in FIG. 1), and any other fields present in the first and second tables. The source field can serve to indicate which of the two tables a row in the matches table originated from. The matches table created at 212 is empty such that it can be populated with data from rows of the first and second tables during a subsequent comparison of the first and second tables.

The key safe created at 212 (e.g., key safe 110 of FIG. 1) can be a table that includes the key field(s) common to the first and second tables. In the example shown in FIG. 1, key safe 110 includes two key fields: date and engine. In other examples, the key safe can include a single key field, or more than two key fields. The number of key fields in each of the first table, the second table, and the key safe will be the same. As noted above, values of key field(s) that are common to at least one row of the first and second tables can be referred to as a key combination. Rows of the first and second tables that share the same key combination (e.g., the same values for each key field) can be referred to as "partner rows."

The key safe created at 212 is empty such that it can be populated with key values during a subsequent comparison of the first and second tables. For example, as detailed below, the key combination shared by rows of data in the matches table can be written to the key safe prior after the matches table has been populated with a set of partner rows. This process can happen multiple times during the comparison of the first and second data tables, depending on how many unique key combinations are present in the two tables.

At 214, for each set of partner rows, the matches table is populated and the rows from the first and second tables in the matches table are compared. This process is detailed below with reference to FIG. 4. Matches table 106 of FIG. 1 is an example of a matches table which has been populated with a set of partner rows; all three rows of matches table 106 share the same value of the key fields (i.e., the date and engine fields in the example). After comparison via the techniques described herein, the results table 108 is populated with the results of the comparison. In the example, the results include a row 126 of type "changed" that includes the old and new values of the comparison field (i.e., the quantity field in the example), and a row 128 of type "deleted" that includes the old value of the comparison field which was present in the first table but not the second table in conjunction with the present key combination.

As described herein, step 214 can be performed multiple times, one time for each unique key combination. After each iteration of step 214, the matches table is emptied, and the results table is updated. After step 214 has been performed for each key combination, the results table reflects differences between the data in the first and second data tables.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Such methods can be performed in software, firmware, hardware, or combinations thereof. Such methods can be performed at least in part by a computing system (e.g., one or more computing devices).

The illustrated actions can be described from alternative perspectives while still implementing the technologies. For example, indicating an error can be described as receiving an indication of an error depending on perspective.

Example 4—Example Method of Checking Fields

Figure 3:
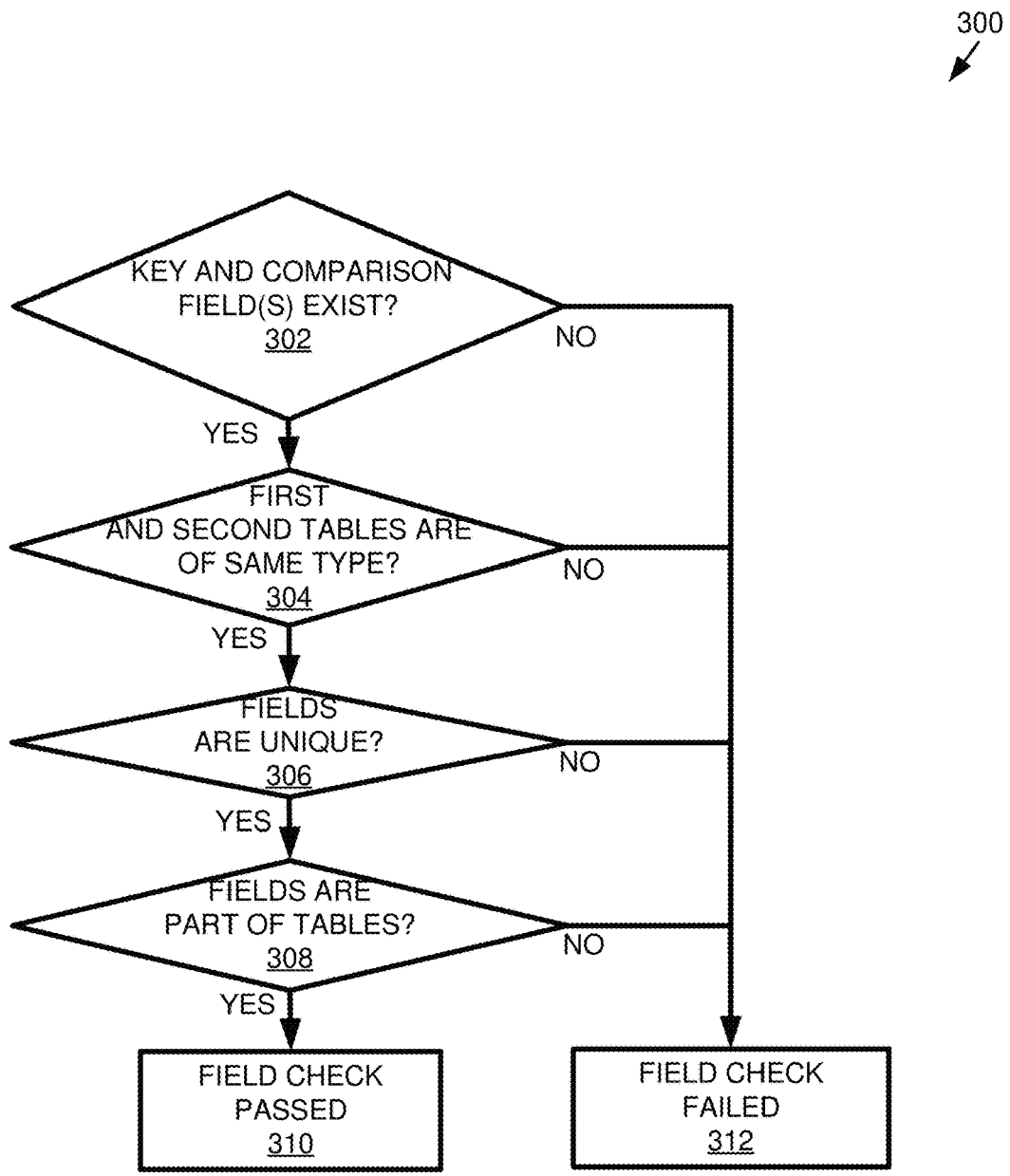
FIG. 3 is a is a flowchart of an example method of checking the fields of two data tables before comparing the data tables.

FIG. 3 is a flowchart of an example method 300 of checking the fields of two data tables before comparing the data tables and can be performed, for example, by the database system of FIG. 1. Method 300 can be performed at step 202 of method 200, for example.

Prior to execution of method 300, a user of a database system can provide input (e.g., via a user interface) specifying a first table for comparison and a second table for comparison. The user can also designate one or more fields common to the two tables as key fields, one or more different fields common to the two tables as comparison fields, and one or more fields common to the two tables which are not used as key fields or comparison fields as "other fields." The designated key field(s) can be stored in a key fields table, and the designated comparison field(s) can be stored in a comparison fields table. Any fields not designated as key fields, comparison fields, or other fields can be ignored by method 300.

At 302, it is determined whether the designated key field(s) and comparison field(s) exist. In practice, this can include a processor reading the key fields table and comparison fields table to determine whether either table is empty. If the answer at 302 is NO, indicating that the key fields table and/or the comparison fields table is empty, the field check fails at 312. In such an example, the processor (or a user receiving an indication that the field check has failed) can halt the comparison process of the first and second tables.

Otherwise, if the answer at 302 is YES, the method proceeds to determine whether the first and second tables are of the same type at 304. The first and second tables can be considered to be of the same type when they each include the designated key field(s) and the designated comparison field(s). If the answer at 304 is NO, indicating that the first and second tables are not of the same type, the field check fails at 312. For example, the first and second tables may be different types of tables when a user makes a mistake in implementing the comparison method (such as designating the wrong fields as key fields or comparison fields).

Otherwise, if the answer at 304 is YES, the method proceeds to determine whether the fields in the first and second tables are unique at 306. In practice, this can include a processor populating a table with the designated key, comparison, and other fields and storing the number of lines in the table. The processor can then sort the table, identify adjacent duplicates, delete any identified duplicates, and then check whether the number of lines in the table after deletion of any identified duplicates matches the stored number of lines. If the numbers of lines do not match, it follows that at least one field appeared twice and thus the fields are not all unique.

If the answer at 306 is NO, indicating that the fields of the first and second tables are not all unique, the field check fails at 312. Otherwise, if the answer at 306 is YES, indicating that all the fields of the first and second tables are unique, the method proceeds to determine whether the fields are part of the tables at 308. For example, if a user implementing the comparison method attempts to compare tables that do not contain one or more of the specified key fields or comparison fields, it will be determined that the fields (e.g., the specified fields) are not part of the tables.

If the answer at 308 is NO, indicating that the fields are not part of the tables, the field check fails at 312. In contrast, if the answer at 308 is YES, the field check passes at 310. In such an example, the processor (or a user receiving an indication that the field check has passed) can proceed to initiate the comparison process of the first and second tables.

Example 5—Example Method of Populating a Matches Table

Figure 4:
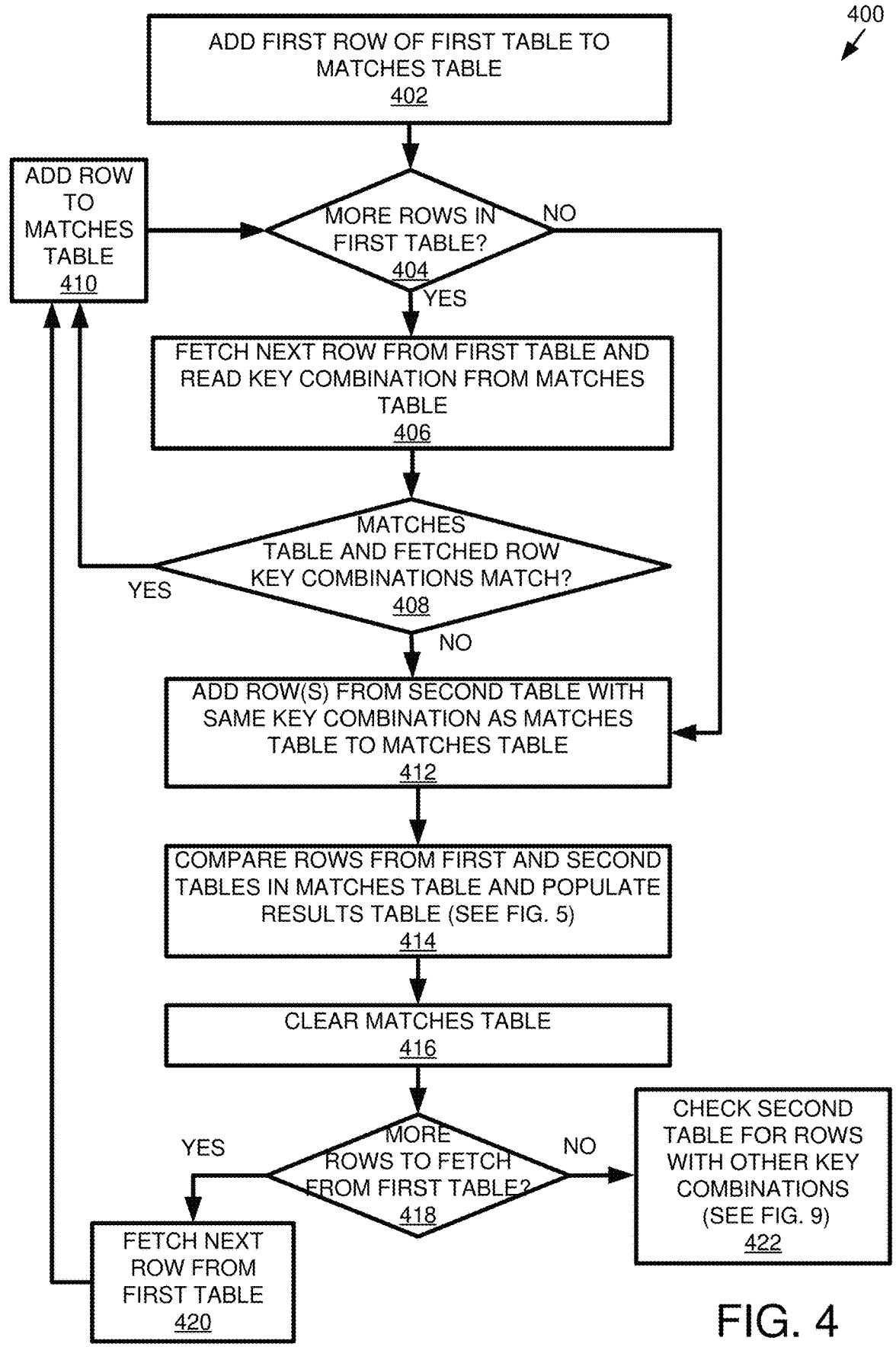
FIG. 4 is a flowchart of an example method of populating a matches table with rows of two data tables that share a common key combination.

FIG. 4 is a flowchart of an example method 400 of populating a matches table with rows of two data tables that share a common key combination and can be performed, for example, by the database system of FIG. 1. Method 400 can be performed at step 214 of method 200, for example. As described herein, method 400 can be performed multiple times, once for each unique key combination.

At 402, the first row of the first table is added to the matches table. For example, the first table can be stored in memory of a database system, and a processor can fetch the first row from the first table and insert it into a matches table (e.g., the matches table created at step 212 of method 200). Adding a row from the first table to the matches table can include populating the source field of the matches table with the value "first table" to indicate that the row originated from the first table.

At 404, it is determined whether there are more rows in the first table. If the answer at 404 is YES, the method proceeds to 406 to fetch the next row from the first table and read the key combination from the matches table. In this instance, the key combination read from the matches table includes the values of the key field(s) in the first row that was inserted into the matches table at 402. Because all rows of the matches table will have the same key combination, reading the key combination from the matches table can include reading the key combination from the first row or any other populated row of the matches table.

At 408, it is determined whether the key combination in the matches table is the same as the key combination in the row that was fetched from the first table at 406. If the answer at 408 is YES, that row is added to the matches table at 410. As noted above, adding a row from the first table to the matches table can include populating the source field of the matches table with the value "first table" to indicate that the row originated from the first table.

After 408, the method returns to 404. Accordingly, the method proceeds to iterate through steps 404, 406, 408, and 410 for each additional row of the first table which has a key combination matching the key combination in the matches table (e.g., the key combination shared by all the rows in the matching table).

However, when the answer at 404 is NO, indicating that there are no more rows in the first table, or when the answer at 408 is NO, indicating that the key combination of the fetched row does not match the key combination in the matches table, the method proceeds to 412 to add rows from the second table with the matching key combination to the matches table. For example, the second table can be stored in memory of a database system, and a processor can fetch any rows of the second database table whose key combination matches the key combination in the matches table and insert those rows into the matches table. Adding the row(s) from the second table to the matches table can include populating the source field of the matches table with the value "second table" to indicate that the row originated from the second table.

At 414, the rows in the matches table from the first and second tables are compared, and the results table is populated with the results of the comparison. This process is detailed below with reference to FIG. 5. The matches table is then cleared at 416, and it is determined at 418 whether there are more rows in the first table (e.g., whether the last row fetched from the first table was the last row in the first table).

If the answer at 418 is YES, the method proceeds to fetch the new row from the first table at 420, and then returns to 410 to add the row to the matches table. Accordingly, the key combination in the row fetched at 420 becomes the new key combination for the matches table. The method then iterates through steps 404, 406, 408, and 410 for however many additional rows there are with a key combination matching the key combination in the matches table, and then iterates through steps 412, 414, 416, and 418 (and steps 420 and 410 etc. if there are more rows in the first table).

Otherwise, if the answer at 418 is NO indicating that there are no more rows to fetch from the first table (e.g., all rows were already fetched during execution of method 400), the method proceeds to 422 to check the second table for rows with other key combinations. This process is detailed below with reference to FIG. 9. For example, if the second table includes any rows that do not have any partner rows in the first table, those rows will not have been added to the matches table during any of the prior steps of method 400. Accordingly, step 422 is performed to ensure such rows are included in the results table as "added" rows.

Example 6—Example Matches Table

Table 1 below shows example fields for a matches table with n key fields and n comparison fields.

TABLE 1

Example Matches Table Fields

| Name | Description | Example Values |
| --- | --- | --- |
| Source | Indicates whether the row originated from the first table or the second table. | First Table<br>Second Table |
| Key Field 1<br>. . .<br>Key Field n | These fields collectively form a key combination used to define partner rows for comparison. A single key field can also be used. Any field common to the first and second tables with values that do not need to be compared can be chosen as a key field. | Any string<br>(e.g., Jan. 4, 2023 or 2) |
| Comparison Field 1<br>. . .<br>Comparison Field n | The comparison field(s) are populated with the values of the corresponding comparison field(s) in the source table for the row. A single comparison field can also be used. | Any string<br>(e.g., 4, 6, 5) |
| Other Field 1<br>. . .<br>Other Field n | The other fields are populated with the values of the corresponding other field(s) in the source table for the row. The first and second tables, and thus the matches table, can alternatively have no other fields or a single other field. | Any string |

Example 7—Example Method of Comparing Rows

Figure 5:
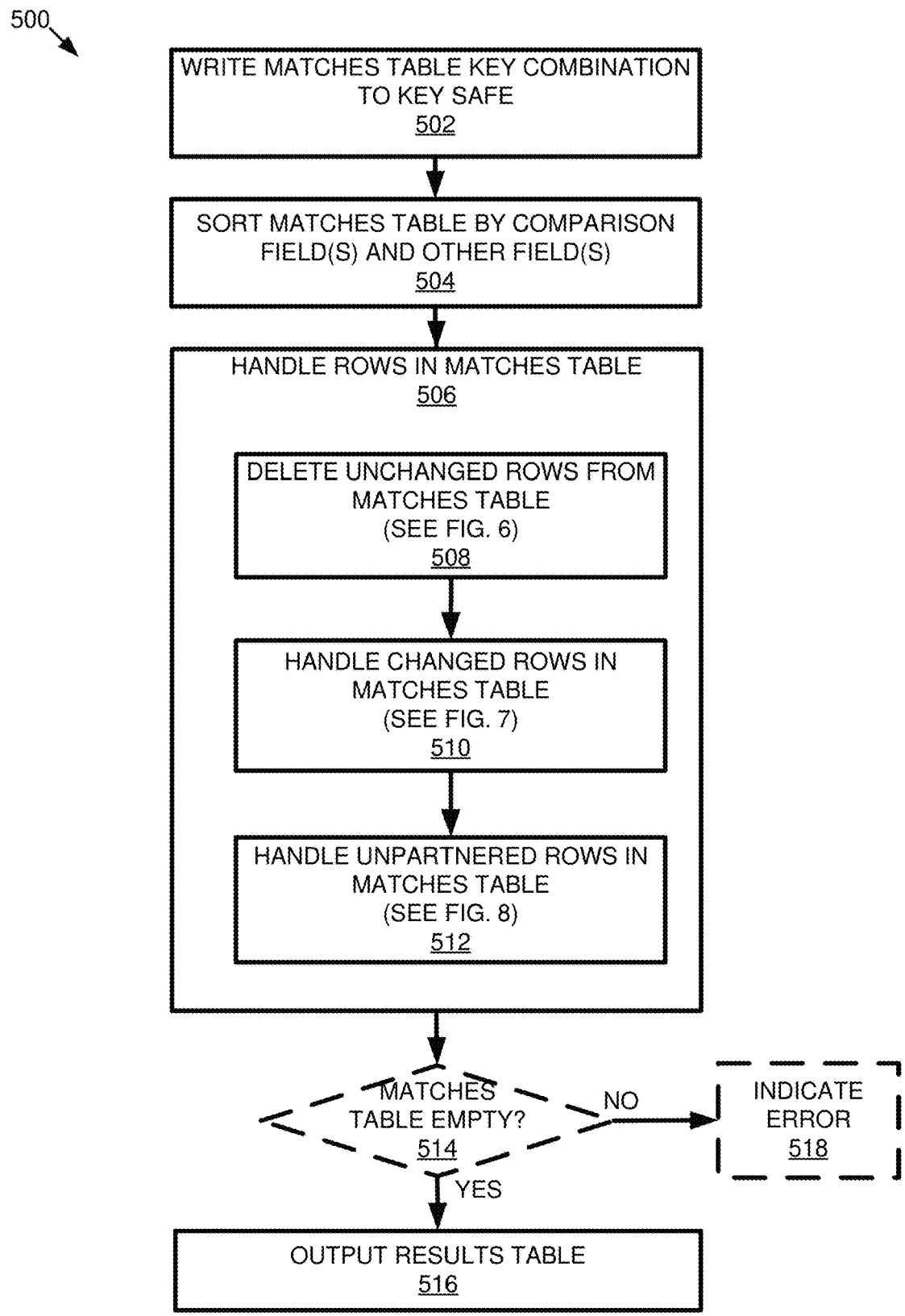
FIG. 5 is a flowchart of an example method of comparing rows from two data tables in a matches tables and populating a results table based on the comparison.

FIG. 5 is a flowchart of an example method 500 of comparing rows from two data tables in a matches tables and populating a results table based on the comparison. Method 500 can be performed, for example, by the database system of FIG. 1. Method 500 can be performed at step 414 of method 400, for example. At this stage of method 400, rows from the first and second tables with a common key combination have been added to the matches table.

At 502, the key combination in the matches table is written to the key safe. For example, with reference to FIG. 1, matches table 106 includes rows with the key combination (Date=Jan. 4, 2023, Engine=2), and this key combination has been added to key safe 110. In the example, key safe 110 also includes other key combinations which were written during prior iteration of method 400.

At 504, the matches table is sorted by the comparison field(s) and by any other fields that are present. In the example shown in FIG. 1, matches table 106 includes one comparison field (quantity) and no other fields, for the sake of simplicity. It will be appreciated that the matches table could instead include another number of comparison fields and no other fields or any number of other fields. Matches table 106 has not yet been sorted by the comparison field (quantity); Table 2 below shows matches table 106 after the rows have been sorted by quantity. Sorting the matches table can facilitate the comparison of rows from the first and second tables by placing rows that should be compared closer to each other.

TABLE 2

Example Matches Table After Sorting

| Source | Date | Engine | Quantity |
|---|---|---|---|
| First Table | Jan. 4, 2023 | 2 | 4 |
| Second Table | Jan. 4, 2023 | 2 | 5 |
| First Table | Jan. 4, 2023 | 2 | 6 |

At 506, rows in the matches table are handled. In practice, the rows can be handled using a duplicate-aware row matching technique. This technique includes deleting unchanged rows from the matches table at 508; a process for deleting unchanged rows is detailed below with reference to FIG. 6. As used herein, an "unchanged row" is a row that has an identical match in the other table. For example, the first three rows of first table 102 and second table 104 are unchanged rows, and thus all of these rows would be deleted from the matches table during execution of method 500 during the respective iteration of method 400.

Handling the rows in the matches table at 506 using the duplicate-aware row matching technique also includes handling changed rows in the matches table at 510; a process for handling changed rows is detailed below with reference to FIG. 7. As used herein, a "changed row" is a row which has a partner row in the other table with a different value for the comparison field (or at least one different value for a comparison field in an example with multiple comparison fields).

In addition, handling the rows in the matches table at 506 using the duplicate-aware row matching technique also includes handling unpartnered rows in the matches table at 512; a process for handling unpartnered rows is detailed below with reference to FIG. 8. As used herein, an "unpartnered row" is a row which does not have a partner row in the other table. Row 119 in second table 104 of FIG. 1 is an example of an unpartnered row; first table 102 does not include any rows with a key combination matching that of row 119 (i.e., the key combination (Date=1/4/2023, Engine=1)).

After handling the rows in the matches table at 506, the method optionally proceeds to determine whether the matches table is empty at 514. If the answer at 514 is NO, indicating that the matches table is not empty, an error is indicated at 518.

Otherwise, if the answer at 514 is YES, or if step 514 is omitted, the method proceeds to 516 to output the results table. For example, the results table can be output to a user of the database system via a user interface, output to a file, or output in another manner.

Example 8—Example Method of Deleting Unchanged Rows

Figure 6:
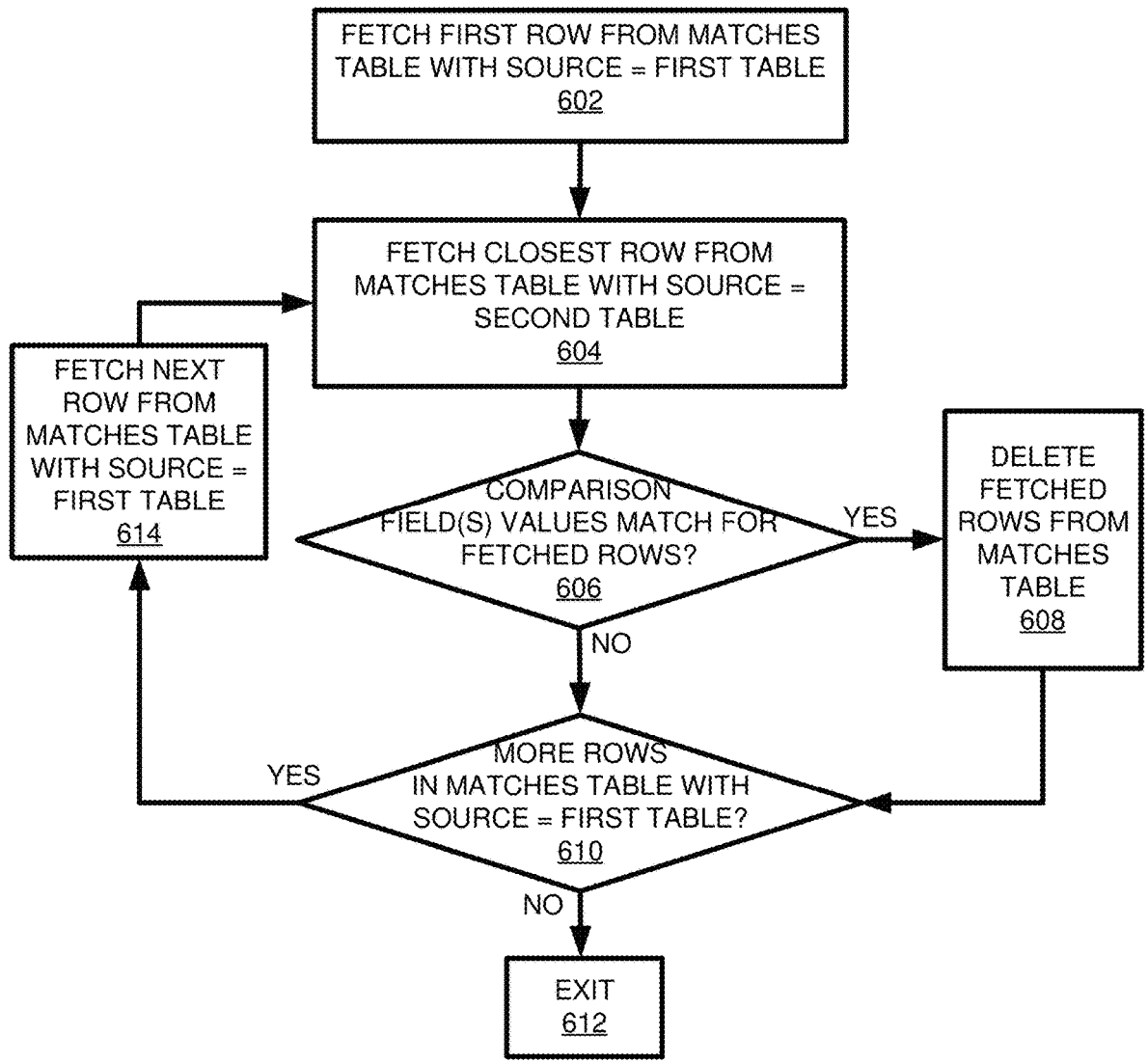
FIG. 6 is a flowchart of an example method of deleting unchanged rows during a comparison of two data tables.

FIG. 6 is a flowchart of an example method 600 of deleting unchanged rows during a comparison of two data tables and can be performed, for example, by the database system of FIG. 1. Method 600 can be performed at step 508 of method 500, for example.

At 602, a row is fetched from the matches table that has the value "first table" in the source field. For example, at the first iteration of step 602, the fetched row can be the first row in the matches table that originated from the first table (e.g., the first row in Table 2 above).

At 604, the next row in the matches table that has the value "second table" in the source field is fetched. The next row can be the row closest to the row fetched at 602 which originated from the second table (e.g., the row among the rows with source ="second table" with a row number in the matches table that differs the least from the row number of the row fetched at 602 in the matches table) in the sorted matches table. Referring again to Table 2 above, the second row would be fetched at this stage.

At 606, it is determined whether the values of the comparison field(s) in the rows fetched at 602 and 604 match. If the answer at 606 is YES, indicating that the rows fetched at 602 and 604 have identical values for any comparison fields, the method proceeds to delete the fetched rows from the matches table at 608. Accordingly, when the results table is subsequently populated from the matches table, unchanged rows will not be included.

In contrast, in the example shown in Table 2 above, the answer at 606 would be NO, as the first and second rows have different values for the comparison field (engine). If the answer is NO, the method proceeds to 610 to determine whether the are more rows in the matches table that originated from the first table (e.g., rows where the source field value is "first table").

If the answer at 610 is NO, the method exits at 612. Otherwise, if the answer at 610 is YES, the method proceeds to fetch the next row from the matches table that originated from the first table. After 614, the method iterates through steps 604, 606, 608, 610, and/or 614 until no rows that originated from the first table remain in the matches table.

Example 9—Example Method of Handling Changed Rows

Figure 7:
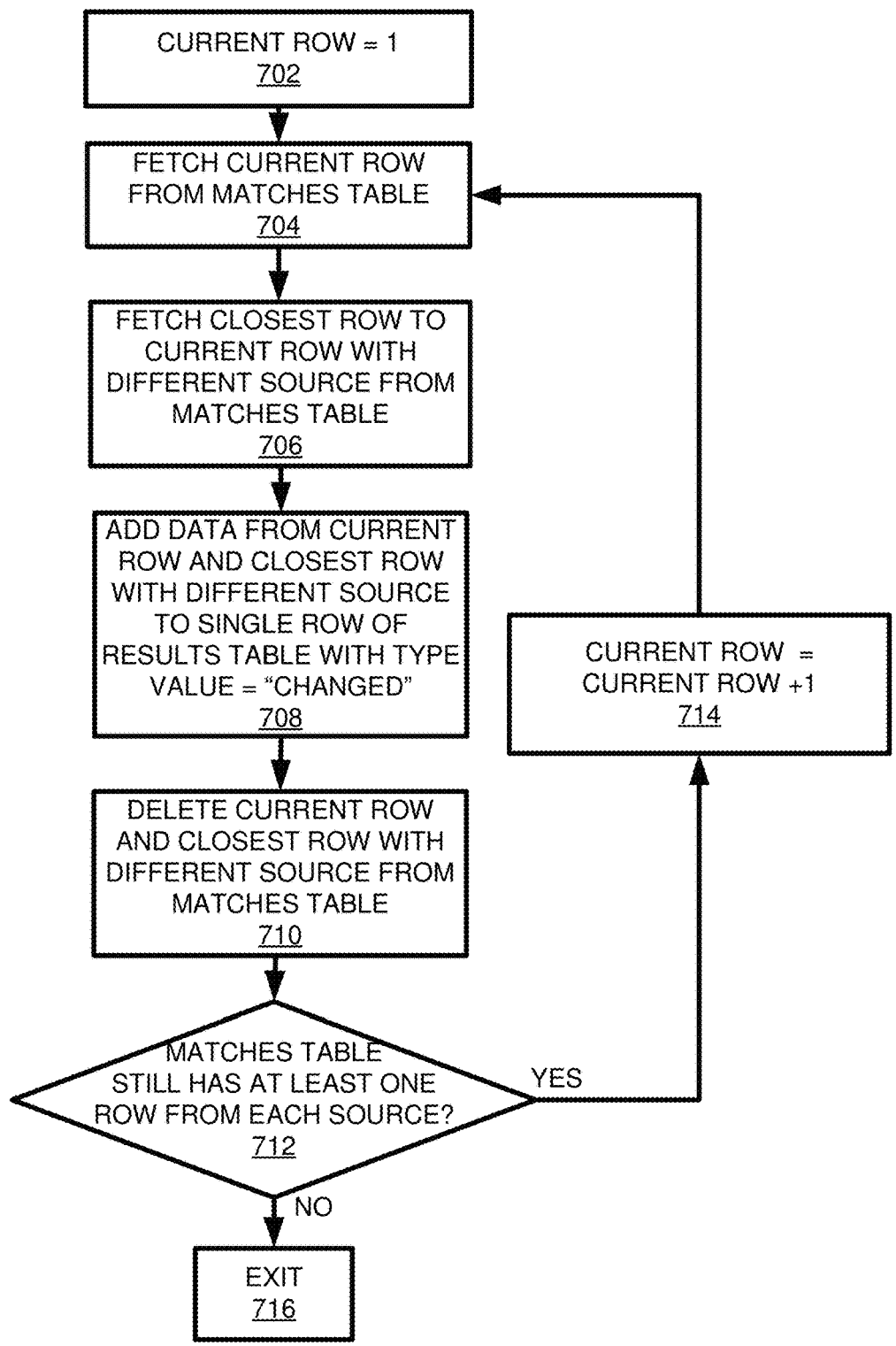
FIG. 7 is a flowchart of an example method of handling changed rows during a comparison of two data tables.

FIG. 7 is a flowchart of an example method 700 of handling changed rows during a comparison of two data tables and can be performed, for example, by the database system of FIG. 1. Method 700 can be performed at step 510 of method 500, for example.

At 702, the current row (e.g., a variable representing a row number) is set equal to 1. The row with a number corresponding to the current row (e.g., row 1 of the matches table during the first iteration of method 700) is then fetched from the matches table at 704. At 706, the closest row to the current row with a different source (e.g., a different value for the source field) is fetched.

At 708, data from the rows fetched at 704 and 706 (i.e., the current row and the row closest to the current row with a difference source) is added to a single row of the results table, and the type field for that row is populated with the value "changed". For example, Table 2 above corresponds to matches table 106 after matches table 106 has been sorted. In an example where the first row of Table 2 is the current row, the second row of Table 2 would be the row closest to the first row with a different source. Row 126 of results table 108 of FIG. 1 shows the result of adding data from the first and second rows of Table 2 to a single row of the results table and populating the type field for that row with the value "changed." In particular, row 126 has a value of "changed" in the type field, and the values of the key fields (date and engine) match the common values of the key fields in the first and second rows of Table 2.

Whereas the first and second tables and the matches table each have a single comparison field (quantity), results table 108 has two fields associated with this comparison field: a "new" quantity field and an "old" quantity field. In examples where the first and second tables each have multiple comparison fields, the corresponding results table would have "new" and "old" fields for each comparison field. To illustrate this point, Table 3 below shows example fields for a results table with n key fields and n comparison fields. As shown, the results field also has "old" and "new" fields associated with each other field in the matches table.

TABLE 3

Example Results Table Fields

| Name | Description | Example Values |
| --- | --- | --- |
| Type | Indicates whether the corresponding row was changed (e.g., the comparison values of the two rows being compared are different), added (e.g., present in the second table but not the first table), or deleted (e.g., present in the first table but not the second table) | Changed ( ) <br> Added (+) <br> Deleted (−) |
| Key Field 1 <br> . . . <br> Key Field n | These fields collectively form a key combination used to define partner rows for comparison. A single key field can also be used. Any field common to the first and second tables with values that do not need to be compared can be chosen as a key field. | Any string <br> (e.g., Jan. 4, 2023 or 2) |
| Comparison Field 1 - Old <br> Comparison Field 1 - New <br> . . . <br> Comparison Field n - Old <br> Comparison Field n - New | The "old" comparison fields are populated with the values of the corresponding comparison fields in the first table, and the "new" comparison fields are populated with the values of the corresponding comparison fields in the second table. A single comparison field can also be used (in which case there would be one "old" comparison field and one "new" comparison field) | Any string <br> (e.g., 4, 6, 5) |
| Other Field 1 - Old <br> Other Field 1 - New <br> . . . <br> Other Field n - Old <br> Other Field n - New | The "old" other fields are populated with the values of the corresponding other fields in the first table, and the "new" other fields are populated with the values of the corresponding other fields in the second table. The first and second tables, and thus the results table, can alternatively have no other fields or a single other field. | Any string |

Each row of the results table with type "changed" represents two rows from the sorted matches table: a row that originated from the first table, and the closest row with a higher row number that originated from the second table. In contrast, each row with type "Deleted" represents a row that originated from the first table but is not present in the second table, and each row with type "Added" represents row that originated from the second table but is not present in the first table. As shown in Table3, in some examples, a changed row can be denoted by a blank type field, an added row can be denoted by a "+" in the type field, and a deleted row can be denoted by a "–" in the type field.

Returning to method 700, at 710, the current row and the closest row (i.e., the rows whose data was added to the results table at 708) are deleted from the matches table. Next, it is determined at 712 whether the matches table still has at least one row from each source table. If the answer at 712 is NO, the method exits at 716. At this stage, the method can proceed to step 512 of method 500 (and thus, to FIG. 8) to handle unpartnered rows in the matches table.

Otherwise, if the answer at 712 is YES indicating that the matches table still has at least one row from each source, the method proceeds to 714 to increment the row number of the current row (e.g., the variable representing the current row number) by 1. The method then returns to 704 to fetch the current row from the matches table, and iterates through steps 704, 706, 708, 710, 712, and/or 714 until the matches table no longer contains at least one row from each source. Accordingly, the results table is populated with changed rows.

Example 10—Example Method of Handling Unpartnered Rows

Figure 8:
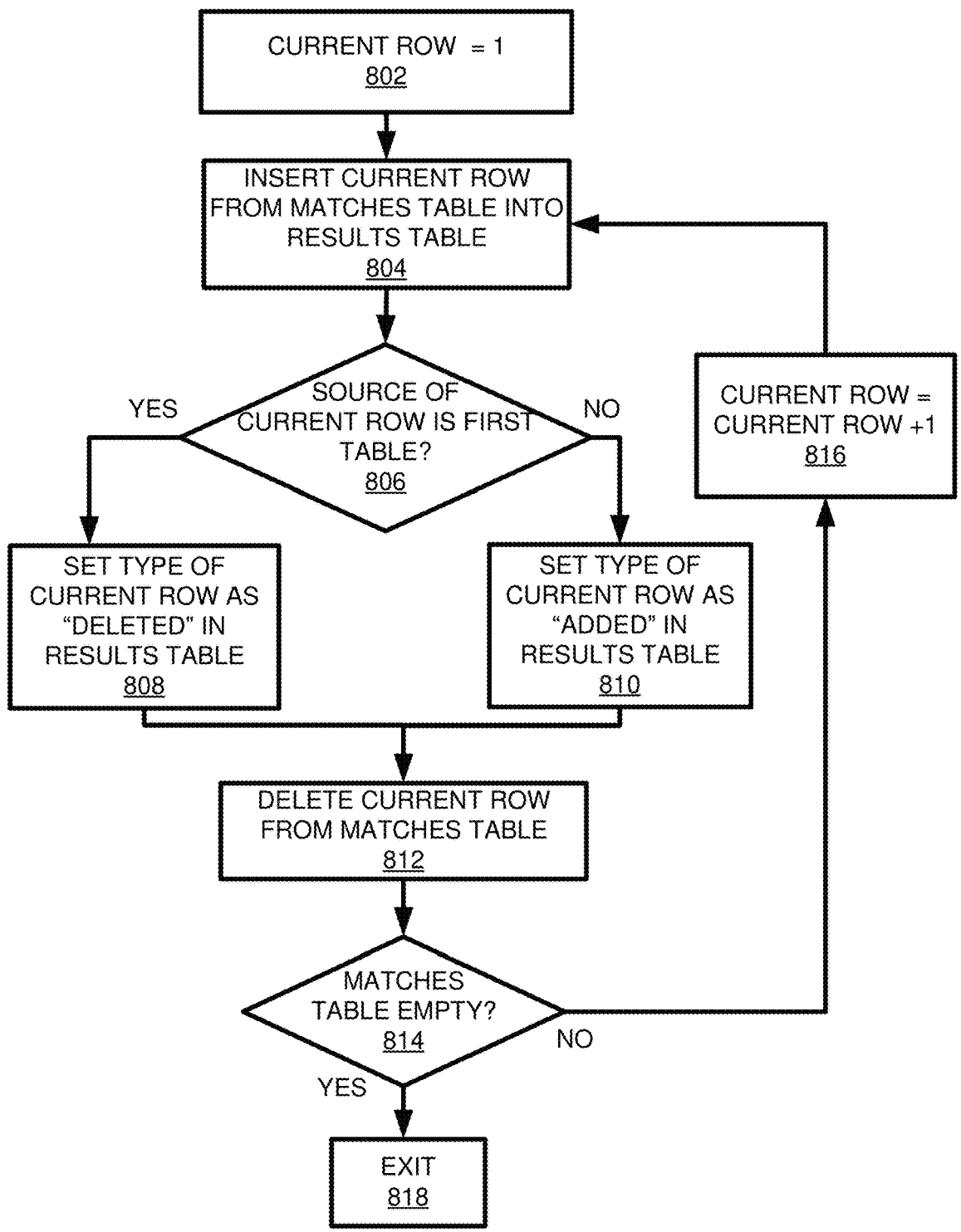
FIG. 8 is a flowchart of an example method of handling unpartnered rows during a comparison of two data tables.

FIG. 8 is a flowchart of an example method 800 of handling unpartnered rows during a comparison of two data tables and can be performed, for example, by the database system of FIG. 1. Method 800 can be performed at step 512 of method 500, for example.

At 802, the current row number is set equal to 1. The current row (e.g., row 1 of the matches table during the first iteration of method 800) is then inserted from the results table at 804. As it is an unpartnered row, either the "new" or "old" version of each comparison field in the corresponding row of the results table will be empty. For example, row 128 of results table 108 of FIG. 1 is an example of an unpartnered row, the new quantity field of this row is empty as the row was only present in the first table and did not have a partner row from the second table.

At 806, it is determined whether the source of the current row is the first table. If the answer at 806 is YES, the type field of the corresponding row of the results table is populated with the value "Deleted" at 808. For example, row 128 of results table 108 of FIG. 1 has the value "Deleted" in the type field because the row originated from the first table (e.g., as indicated by the value "First Table" in the source field of the corresponding row 122 of matches table 106 of FIG. 1).

Otherwise, if the answer at 806 is NO and thus the source of the current row is the second table, the type field of the corresponding row of the results table is populated with the value "Added" at 810.

At 812, the current row is deleted from the matches table. The method then proceeds to determine at 814 whether the matches table is empty. If the answer at 814 is YES, the method exits at 818. At this stage, the method can proceed to step 514 of method 500.

Otherwise, if the answer at 814 is NO indicating that the matches table still has at least one row, the method proceeds to 816 to increment the row number of the current row (e.g., the value of the current row variable) by 1. The method then returns to 804 to insert the current row from the matches table into the results table, and iterates through steps 806, 808, 810, 812, 814, and/or 816 until the matches table no longer contains any rows. Accordingly, the results table is populated with unpartnered (deleted or added) rows.

Figure 9:
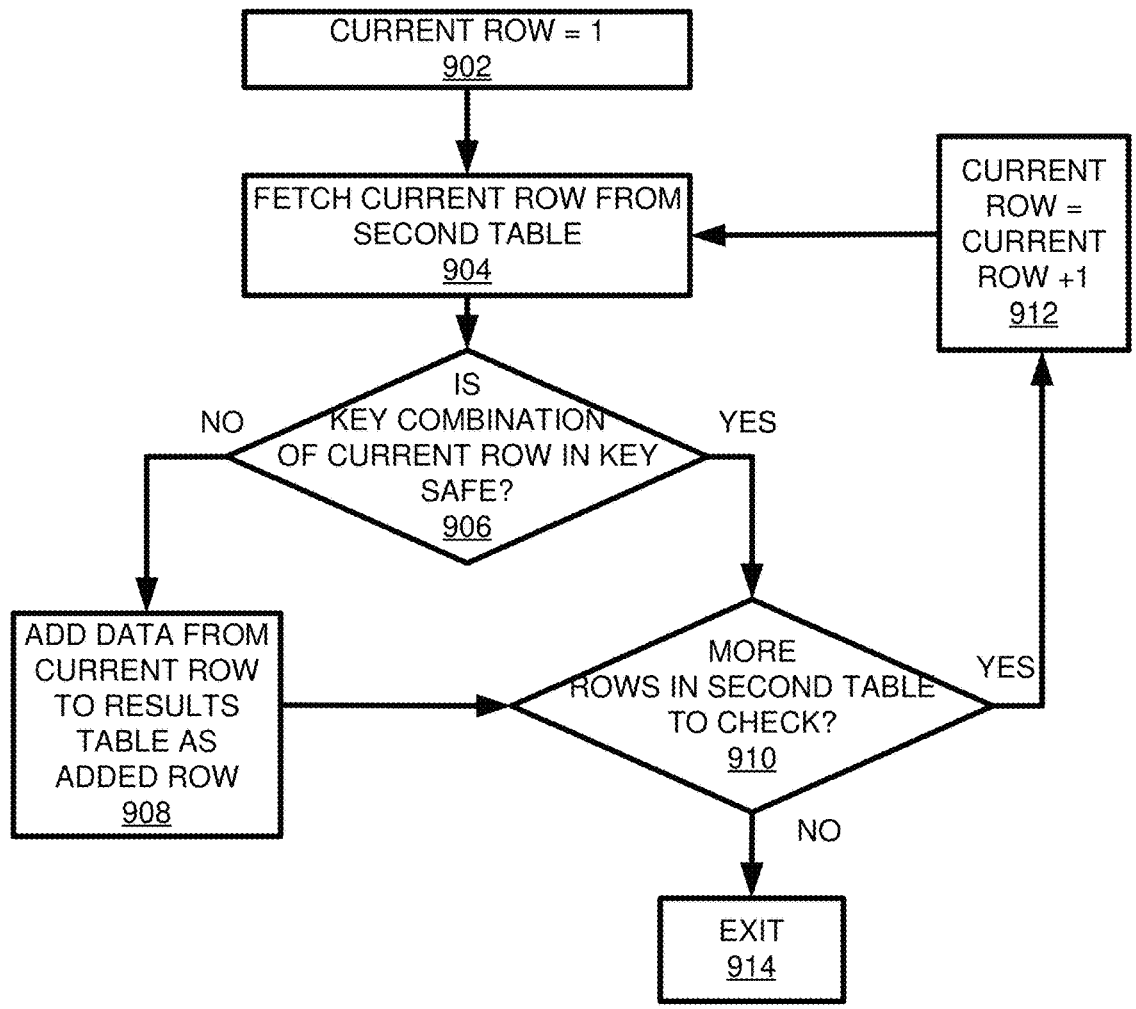
FIG. 9 is a flowchart of an example method of checking a second data table for rows with other key combinations during a comparison of two data tables.

Example 11—Example Method of Checking Second Date Table for Rows with Other Key Combinations FIG. 9 is a flowchart of an example method 900 of checking a second data table for rows with other key combinations during a comparison of two data tables. Method 900 can be performed, for example, by the database system of FIG. 1. Method 900 can be performed at step 422 of method 500, for example.

At 902, the current row (e.g., a variable representing a row number) is set equal to 1. The row with a number corresponding to the current row is then fetched from the second table at 904. At 906, it is determined whether the key combination of the current row is present in the key safe (e.g., key safe 110 of FIG. 1). If the key combination of the current row is not present in the key safe, there were no rows in the first table with that key combination, and thus the row is an "added" row which has not yet been inserted in the results table. Accordingly, if the answer at 906 is NO, data from the current row is added to the results table as an "added" row at 908.

Otherwise, if the answer at 906 is YES, it can be assumed that the current row was added to the matches table and handled in a previous step. Accordingly, in this case, the method proceeds to determine whether there are more rows in the second table to check at 910. If the answer at 910 is NO, the method exits. At this stage, the comparison process is complete.

Otherwise, if the answer at 910 is YES, the method proceeds to 912 to increment the row number of the current row (e.g., the value of the current row variable) by 1. The method then returns to 904 to fetch the current row from the second table, and iterates through steps 906, 908, 910, and/or 912 until there are no more rows in the second table to check. Accordingly, the results table is populated with any rows in the second table with key combinations that are not present in the first table.

Example 12—Use Cases

The technologies described herein can be applied in a variety of scenarios.

As just one example, the technologies described herein can be used in a real estate management platform, such as SAP Real Estate Management available from SAP SE of Walldorf, Germany, to compare valuation cashflow tables.

As another example, the technologies described herein can be used in the context of data integration and Extract, Transform, Load (ETL). Data integration and ETL involves combining data from multiple sources and identifying commonalities and differences in the data. The technologies described herein can help to ensure consistency and accuracy during the integration process.

In addition, the technologies described herein can be helpful when performing data quality assurance, which can include comparison of datasets to check for missing values, outliers, or inconsistencies between different versions of a dataset.

Further, the technologies described herein can be implemented in the context of database synchronization. In database management systems, data tables may need to be synchronized across different environments. The comparison methods described herein can be used to identify discrepancies between data tables during database synchronization.

Similarly, the technologies described herein can be used to facilitate version control in data warehousing scenarios. In such scenarios, the comparison methods described herein can help to track changes to historical datasets over time.

Still further, the technologies described herein can be employed to assist with business intelligence and reporting platforms. For example, the comparison methods described herein can be used to validate data consistency before generating reports or analytics.

As another example, the technologies described herein can facilitate data matching and linkage for applications such as customer relationship management or healthcare. Data matching and linkage can include merging and linking records from different sources; the comparison methods described herein can assist in quickly identifying changes to common records from different sources.

Example 13—Example Implementations

Any of the following can be implemented.

Clause 1. A computer-implemented method comprising: receiving a request to compare a first data table with a second data table, the first data table and the second data table each including a common key field and a common comparison field; and responsive to the request: sorting the first data table and the second data table by the common key field and the common comparison field; generating a matches table comprising the common key field, the common comparison field, and a source field; identifying partner rows in the first data table and the second data table whose respective common key fields have a common value; populating the matches table with data from each of the partner rows, the data including the common value of the common key field, the value of the common comparison field for the partner row, and an indication of a source table of the partner row; sorting the matches table by the common comparison field; and handling the data in the matches table, comprising: comparing a first row of the matches table having a first row number with a second row of the matches table having a second row number, wherein a value of the source field of the first row indicates that the data in the first row originated from the first data table, and wherein a value of the source field of the second row indicates that the data in the second row originated from the second data table; and populating a results table based on the comparison.

Clause 2. The method of Clause 1, wherein an absolute difference between the first row number and the second row number is smaller than an absolute difference between the first row number and a row number of any other row of the matches table whose data originated from the second data table.

Clause 3. The method of any one of Clauses 1-2, wherein the results table comprises a type field, the common key field, an old comparison field, and a new comparison field, and wherein populating the results table based on the comparison comprises: populating the type field of a first row of the results table with a value indicating that data in corresponding rows of the first and second data tables changed; populating the common key field of the first row of the results table with the common value of the common key field;

populating the old comparison field of the first row of the results table with the value of the common comparison field from the first row of the matches table; and populating the new comparison field of the first row of the results table with the value of the common comparison field from the second row of the matches table.

Clause 4. The method of any one of Clauses 1-3, wherein handling the data in the matches table further comprises: deleting unchanged rows from the matches table; and handling unpartnered rows in the matches table.

Clause 5. The method of Clause 4, wherein deleting unchanged rows from the matches table is performed prior to comparing the first row of the matches table with the second row of the matches table.

Clause 6. The method of Clause 5, wherein deleting unchanged rows from the matches table comprises: fetching a third row of the matches table having a third row number and a fourth row of the matches table having a fourth row number, wherein a value of the source field of the third row indicates that the data in the third row originated from the first data table, wherein a value of the source field of the fourth row indicates that the data in the fourth row originated from the second data table, and wherein an absolute difference between the third row number and the fourth row number is smaller than an absolute difference between the third row number and a row number of any other row of the matches table whose data originated from the second data table, determining that values of the respective common comparison fields of the third and fourth rows of the matches table are the same; and responsive to the determination, deleting the third and fourth rows from the matches table.

Clause 7. The method of any one of Clauses 4-6, wherein handling unpartnered rows from the matches table is performed after deleting all unchanged rows from the matches table and comparing all partnered rows in the matches table.

Clause 8. The method of Clause 7, wherein handling unpartnered rows from the matches table comprises: determining a value of the source field of a remaining row of the matches table; and responsive to determining that the value of the source field of the remaining row is the first data table, populating the type field of a second row of the results table with a value indicating that data in the corresponding row of the first data table was deleted, and populating the old comparison field of the second row of the results table with the value of the common comparison field from the remaining row of the matches table.

Clause 9. The method of Clause 8, wherein the remaining row is a first remaining row, and wherein handling unpartnered rows from the matches table further comprises: determining a value of the source field of a second remaining row of the matches table; and responsive to determining that the value of the source field of the second remaining row is the second data table, populating the type field of a third row of the results table with a value indicating that data in the corresponding row of the second data table was added, and populating the new comparison field of the third row of the results table with the value of the common comparison field from the second remaining row of the matches table.

Clause 10. The method of any one of Clauses 1-9, wherein the first and second data tables include a plurality of common key fields, wherein the first and second data tables are sorted by the plurality of common key fields and the common comparison field, wherein the matches table further comprises the plurality of common key fields, wherein identifying partner rows in the first and second data tables whose respective common key fields have a respective common values comprises identifying partner rows in the first and second data tables which have common values for each of the plurality of common key fields, and wherein the data populated in the matches table for each of the partner rows further includes the respective common values of the plurality of common key fields.

Clause 11. The method of any one of Clauses 1-10, wherein the first and second data tables include a plurality of common comparison fields, wherein the first and second data tables are sorted by the common key field and the plurality of common comparison fields, wherein the matches table further comprises the plurality of common comparison fields, and wherein the data populated in the matches table for each of the partner rows further includes the values of the plurality of common comparison fields for the partner row.

Clause 12. The method of Clause 10, further comprising: generating a key safe table, the key safe table comprising the plurality of common key fields; and populating the key safe table with the respective common values of the plurality of common key fields.

Clause 13. The method of any one of Clauses 1-12, wherein handling the data in the matches table comprises performing duplicate-aware row matching.

Clause 14. A computing system comprising: at least one hardware processor; at least one memory coupled to the at least one hardware processor; a first data table and second data table stored in memory, the first data table and the second data table each comprising a first key field, a second key field, and a comparison field; one or more non-transitory computer-readable media having stored therein computer-executable instructions that, when executed by the computing system, cause the computing system to perform: receiving a request to compare the first data table with the second data table; and responsive to the request: sorting each of the first data table and the second data table by the first key field, the second key field, and the comparison field; generating a matches table comprising the first key field, the second key field, the comparison field, and a source field; identifying partner rows in the first data table and the second data table in which the first key fields have a first common value and the second key fields have a second common value; populating the matches table with data from each of the partner rows, the data including the first common value of the first key field, the second common value of the second key field, the value of the comparison field for the partner row, and an indication of a source table of the partner row; sorting the matches table by the comparison field; and handling the data in the matches table, comprising comparing rows of the matches table from different source tables and populating a results table based on the comparison.

Clause 15. The system of Clause 14, wherein comparing the rows of the matches table from the different source tables comprises comparing a first row of the matches table having a first row number with a second row of the matches table having a second row number, wherein a value of the source field of the first row indicates that the data in the first row originated from the first data table, and wherein a value of the source field of the second row indicates that the data in the second row originated from the second data table.

Clause 16. The system of any one of Clauses 14-15, wherein the results table comprises a type field, the first key field, the second key field, at least one old comparison field, and at least one new comparison field.

Clause 17. The system of any one of Clauses 14-16, wherein handling the data in the matches table further comprises deleting unchanged rows from the matches table.

Clause 18. The system of any one of Clauses 14-17, wherein handling the data in the matches table further comprises handling unpartnered rows in the matches table.

Clause 19. The system of any one of Clauses 14-18, further comprising a key safe table comprising the first key field and the second key field.

Clause 20. One or more non-transitory computer-readable media comprising computer-executable instructions that, when executed by a computing system, cause the computing system to perform operations comprising: receiving a request to compare a first data table with a second data table, the first data table and the second data table each including a plurality of common key fields and at least one common comparison field; and responsive to the request: sorting each of the first data table and the second data table by the plurality of common key fields and the at least one common comparison field; generating a matches table comprising the plurality of common key fields, the at least one common comparison field, and a source field; identifying partner rows in the first data table and the second data table in which the plurality of common key fields have respective common values; populating the matches table with data from each of the partner rows, the data including the respective common values of the plurality of common key fields for the partner row, the value of the at least one common comparison field for the partner row, and an indication of a source table of the partner row; sorting the matches table by the at least one common comparison field; and handling the data in the matches table, comprising comparing rows of the matches table from different source tables and populating a results table based on the comparison.

Example 14—Example Advantages

A number of advantages can be achieved via the technologies described herein.

For example, the method can be used dynamically. Given two tables of any type, as well as fields that are relevant for comparison and other control parameters, a user can dynamically adjust the comparison method to the circumstances to produce desired results.

As another example, the number of rows in the results table is reduced relative to a typical results table for a data table comparison, especially if the rows have shifted. This reduces the processing load and time for the comparison and thus reduces latency associated with a request by a user to compare data tables.

Further, the techniques described herein provides results that are meaningful to a user. While prior techniques for comparing tables provide results which accurately reflect changes to the data therein, a minor difference such as a missing row in one table can result in an inaccurate indication that the tables are completely different. In contrast, the techniques described herein identify and isolate changes that are meaningful to a user. Due to the legibility of the results table, the technique could be performed by a relatively unsophisticated user of a database system and is not limited to administrative users or data scientists.

Example 15—Example Computing Systems

Figure 10:
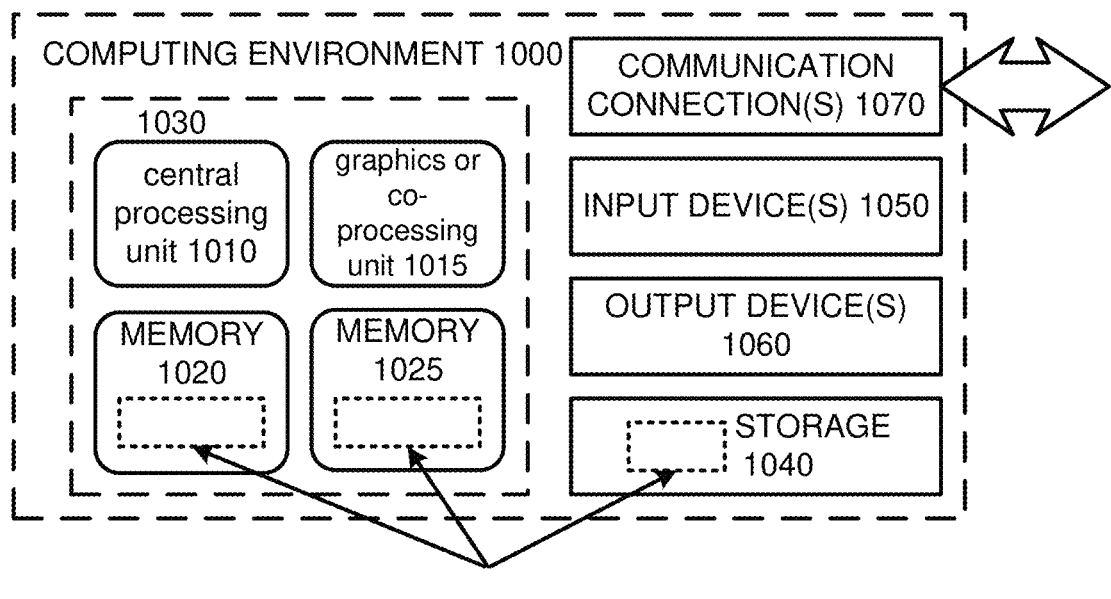
FIG. 10 is a block diagram of an example computing system in which described embodiments can be implemented.

FIG. 10 depicts an example of a suitable computing system 1000 in which the described innovations can be implemented. The computing system 1000 is not intended to suggest any limitation as to scope of use or functionality of the present disclosure, as the innovations can be implemented in diverse computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 can be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 can have additional features. For example, the computing system 1000 includes storage 1040, one or more input devices 1050, one or more output devices 1060, and one or more communication connections 1070, including input devices, output devices, and communication connections for interacting with a user. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 can be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 can be an input device such as a keyboard, mouse, pen, or trackball, a voice input device, a scanning device, touch device (e.g., touchpad, display, or the like) or another device that provides input to the computing system 1000. The output device(s) 1060 can be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 16—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 17—Example Cloud Computing Environment

Figure 11:
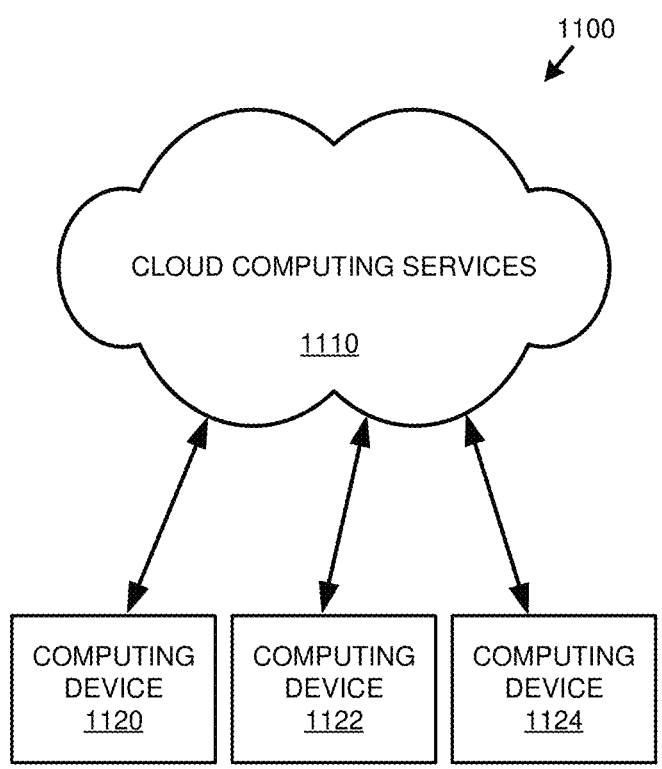
FIG. 11 is a block diagram of an example cloud computing environment that can be used in conjunction with the technologies described herein.

FIG. 11 depicts an example cloud computing environment 1100 in which the described technologies can be implemented, including, e.g., the system 100 of FIG. 1 and other systems herein. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

In practice, cloud-based, on-premises-based, or hybrid scenarios can be supported.

Example 18—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 19—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
   receiving a request to compare a first data table with a second data table, the first data table and the second data table each including a common key field and a common comparison field; and
   responsive to the request:
   sorting the first data table and the second data table by the common key field and the common comparison field;
   generating a matches table comprising the common key field, the common comparison field, and a source field;
   identifying partner rows in the first data table and the second data table whose respective common key fields have a common value;
   populating the matches table with data from each of the partner rows, the data including the common value of the common key field, the value of the common comparison field for the partner row, and an indication of a source table of the partner row;
   sorting the matches table by the common comparison field; and
   handling the data in the matches table, comprising:
   comparing a first row of the matches table having a first row number with a second row of the matches table having a second row number, wherein a value of the source field of the first row indicates that the data in the first row originated from the first data table, and wherein a value of the source field of the second row indicates that the data in the second row originated from the second data table; and
   populating a results table based on the comparison.

2. The method of claim 1, wherein an absolute difference between the first row number and the second row number is smaller than an absolute difference between the first row number and a row number of any other row of the matches table whose data originated from the second data table.

3. The method of claim 1, wherein the results table comprises a type field, the common key field, an old comparison field, and a new comparison field, and wherein populating the results table based on the comparison comprises:
   populating the type field of a first row of the results table with a value indicating that data in corresponding rows of the first and second data tables changed;
   populating the common key field of the first row of the results table with the common value of the common key field;
   populating the old comparison field of the first row of the results table with the value of the common comparison field from the first row of the matches table; and
   populating the new comparison field of the first row of the results table with the value of the common comparison field from the second row of the matches table.

4. The method of claim 1, wherein handling the data in the matches table further comprises:
   deleting unchanged rows from the matches table; and
   handling unpartnered rows in the matches table.

5. The method of claim 4, wherein deleting unchanged rows from the matches table is performed prior to comparing the first row of the matches table with the second row of the matches table.

6. The method of claim 5, wherein deleting unchanged rows from the matches table comprises:
   fetching a third row of the matches table having a third row number and a fourth row of the matches table having a fourth row number, wherein a value of the source field of the third row indicates that the data in the third row originated from the first data table, wherein a value of the source field of the fourth row indicates that the data in the fourth row originated from the second data table, and wherein an absolute difference between the third row number and the fourth row number is smaller than an absolute difference between the third row number and a row number of any other row of the matches table whose data originated from the second data table,
   determining that values of the respective common comparison fields of the third and fourth rows of the matches table are the same; and
   responsive to the determination, deleting the third and fourth rows from the matches table.

7. The method of claim 4, wherein handling unpartnered rows from the matches table is performed after deleting all unchanged rows from the matches table and comparing all partnered rows in the matches table.

8. The method of claim 7, wherein handling unpartnered rows from the matches table comprises:
   determining a value of the source field of a remaining row of the matches table; and
   responsive to determining that the value of the source field of the remaining row is the first data table, populating the type field of a second row of the results table with a value indicating that data in the corresponding row of the first data table was deleted, and populating the old comparison field of the second row of the results table with the value of the common comparison field from the remaining row of the matches table.

9. The method of claim 8, wherein the remaining row is a first remaining row, and wherein handling unpartnered rows from the matches table further comprises:
   determining a value of the source field of a second remaining row of the matches table; and
   responsive to determining that the value of the source field of the second remaining row is the second data table, populating the type field of a third row of the results table with a value indicating that data in the corresponding row of the second data table was added, and populating the new comparison field of the third row of the results table with the value of the common comparison field from the second remaining row of the matches table.

10. The method of claim 1, wherein the first and second data tables include a plurality of common key fields, wherein the first and second data tables are sorted by the plurality of common key fields and the common comparison field, wherein the matches table further comprises the plurality of common key fields, wherein identifying partner rows in the first and second data tables whose respective common key fields have a respective common values comprises identifying partner rows in the first and second data tables which have common values for each of the plurality of common key fields, and wherein the data populated in the matches table for each of the partner rows further includes the respective common values of the plurality of common key fields.

11. The method of claim 1, wherein the first and second data tables include a plurality of common comparison fields, wherein the first and second data tables are sorted by the common key field and the plurality of common comparison fields, wherein the matches table further comprises the plurality of common comparison fields, and wherein the data populated in the matches table for each of the partner rows further includes the values of the plurality of common comparison fields for the partner row.

12. The method of claim 10, further comprising:
generating a key safe table, the key safe table comprising the plurality of common key fields; and
populating the key safe table with the respective common values of the plurality of common key fields.

13. The method of claim 1, wherein handling the data in the matches table comprises performing duplicate-aware row matching.

14. A computing system comprising:
at least one hardware processor;
at least one memory coupled to the at least one hardware processor;
a first data table and second data table stored in memory, the first data table and the second data table each comprising a first key field, a second key field, and a comparison field;
one or more non-transitory computer-readable media having stored therein computer-executable instructions that, when executed by the computing system, cause the computing system to perform:
receiving a request to compare the first data table with the second data table; and
responsive to the request:
sorting each of the first data table and the second data table by the first key field, the second key field, and the comparison field;
generating a matches table comprising the first key field, the second key field, the comparison field, and a source field;
identifying partner rows in the first data table and the second data table in which the first key fields have a first common value and the second key fields have a second common value;
populating the matches table with data from each of the partner rows, the data including the first common value of the first key field, the second common value of the second key field, the value of the comparison field for the partner row, and an indication of a source table of the partner row;
sorting the matches table by the comparison field; and
handling the data in the matches table, comprising comparing rows of the matches table from different source tables and populating a results table based on the comparison.

15. The system of claim 14, wherein comparing the rows of the matches table from the different source tables comprises comparing a first row of the matches table having a first row number with a second row of the matches table having a second row number, wherein a value of the source field of the first row indicates that the data in the first row originated from the first data table, and wherein a value of the source field of the second row indicates that the data in the second row originated from the second data table.

16. The system of claim 14, wherein the results table comprises a type field, the first key field, the second key field, at least one old comparison field, and at least one new comparison field.

17. The system of claim 14, wherein handling the data in the matches table further comprises deleting unchanged rows from the matches table.

18. The system of claim 14, wherein handling the data in the matches table further comprises handling unpartnered rows in the matches table.

19. The system of claim 14, further comprising a key safe table comprising the first key field and the second key field.

20. One or more non-transitory computer-readable media comprising computer-executable instructions that, when executed by a computing system, cause the computing system to perform operations comprising:
receiving a request to compare a first data table with a second data table, the first data table and the second data table each including a plurality of common key fields and at least one common comparison field; and
responsive to the request:
sorting each of the first data table and the second data table by the plurality of common key fields and the at least one common comparison field;
generating a matches table comprising the plurality of common key fields, the at least one common comparison field, and a source field;
identifying partner rows in the first data table and the second data table in which the plurality of common key fields have respective common values;
populating the matches table with data from each of the partner rows, the data including the respective common values of the plurality of common key fields for the partner row, the value of the at least one common comparison field for the partner row, and an indication of a source table of the partner row,
sorting the matches table by the at least one common comparison field; and
handling the data in the matches table, comprising comparing rows of the matches table from different source tables and populating a results table based on the comparison.

* * * * *